United States Patent [19]

Gustavsson et al.

[11] 4,227,903
[45] Oct. 14, 1980

[54] FILTER CELL APPARATUS

[75] Inventors: Karl-Axel G. Gustavsson; Holger A. Persson, both of Enköping, Sweden

[73] Assignee: AB Bahco Ventilation, Stockholm, Sweden

[21] Appl. No.: 938,720

[22] Filed: Aug. 31, 1978

[30] Foreign Application Priority Data

Aug. 31, 1977 [SE] Sweden .................................. 7709819

[51] Int. Cl.² ............................................. B01D 46/04
[52] U.S. Cl. ...................................... 55/302; 55/324; 55/328; 55/335; 55/393; 55/418
[58] Field of Search ................. 55/302, 324, 326, 328, 55/, 334, 335, 418, 422, 341 R, 341 NT, 393

[56] References Cited

U.S. PATENT DOCUMENTS

| | | | |
|---|---|---|---|
| 1,743,934 | 1/1930 | Ruemelin | 55/324 |
| 2,189,234 | 2/1940 | Wagner | 55/422 |
| 2,687,782 | 8/1954 | Sonderegger | 55/418 |
| 3,378,994 | 4/1968 | Farr | 55/324 |
| 3,726,066 | 4/1973 | Colley et al. | 55/302 |
| 3,926,595 | 12/1975 | Böckman | 55/335 |
| 3,944,404 | 3/1976 | Andrásfalvy | 55/418 |

FOREIGN PATENT DOCUMENTS

| | | |
|---|---|---|
| 1163644 | 2/1964 | Fed. Rep. of Germany . |
| 2307394 | 8/1974 | Fed. Rep. of Germany . |
| 2141887 | 1/1973 | France . |

*Primary Examiner*—David L. Lacey
*Attorney, Agent, or Firm*—Oblon, Fisher, Spivak, McClelland & Maier

[57] ABSTRACT

A cell filter apparatus of the bag or stocking type having a housing is disclosed. A gas deflector and boundary wall between a raw gas duct and a dust chamber upstream from the filter cells form a tapering duct having an outlet passage for coarse dust particles at its narrow end. Either the deflector or the boundary wall is pivoted so that the size of the outlet passage can vary so as to remove coarse dust from the outlet passage. A gas blast for cleaning the filter cells in a direction to move the pivoted element so that the outlet passage is varied and cleaned.

5 Claims, 3 Drawing Figures

FILTER CELL APPARATUS

The invention relates to a bag or stocking cell filter, e.g. a compact cell filter apparatus. The filter apparatus has a housing including a chamber at the inlet ends of the stockings or filter cells, to which raw gas is supplied. The filter apparatus also has cleaning means for providing cleansing compressed air shocks in the opposite directions to the gas flow through the stockings or cells.

The raw gas supplied to such a filter apparatus is usually subjected to coarse separation in the dust chamber under the stockings or cells, as a result of a deflection in the raw gas flow. With abrasive dust, this coarse separation may need to be improved to protect the stocking or cell material.

The object of the invention is to provide a filter apparatus with such improved separation in the dust chamber, said filter apparatus also having effective means for delivering collected dust to the discharge menas of the dust chamber.

A pair of embodiments of the invention are described in detail in the following while referring to the attached schematic drawings.

FIG. 1 shows a compact cell filter apparatus comprising a housing including a dust chamber 1 in the bottom of which there is a screw conveyor 2 arranged as dust discharging means for emptying the chamber.

Figure 1:
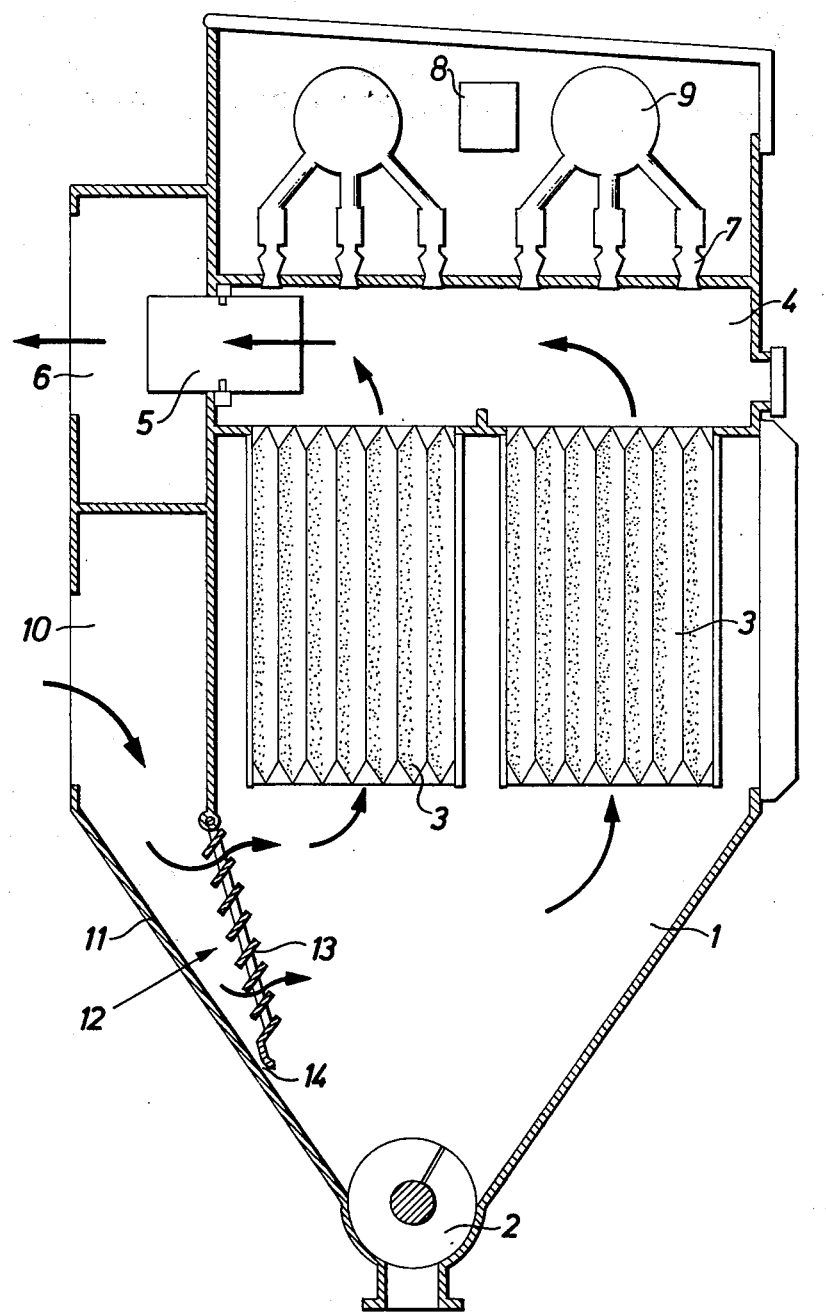
FIG. 1 shows a vertical section through a compact cell filter apparatus according to a first embodiment of the invention.

Two compact filter cell units 3 project dependently in the dust chamber 1. The filter cell units are of a conventional kind and consist of a plurality of parallel channels formed by the filter material, and separated by it, these channels alternately opening upwards and downwards so that alternate channels form a passage for raw gas, the other channels forming cleaned gas passages. Clean gas from both filter cell units 3 is taken out via a collection chamber 4, an aperture provided with a draft or outlet valve 5 and a clean gas duct 6. The collection chamber 4 is sealed against the dust chamber 1 around the filter cell units 3.

A plurality of blower valves with spreader jets 7 open out in the roof of the collection chamber 4 above each filter cell unit 3. The jets 7 are provided for cleaning the filter cell units by means of cleansing compressed air pulses in the opposite direction to the gas flow through the filter cell units. The valves are controlled by a programming mechanism 8. Pressure tanks 9 supplied by a compressor (not shown) provide the valves with compressed air.

Raw gas is supplied through a raw gas duct 10, and is taken down into the chamber 1 along one of its walls 11 inclined towards the screw conveyor 2.

A grating 12 with baffles 13, inclined upwards and inwards towards the interior of the chamber is arranged at an acute angle to said wall 11 of the chamber and defines a duct in the flow direction of the raw gas along the wall 11, with successively diminishing flow cross section. The grating 12 gives a strong deflection to the raw gas flow, thereby forming a lamella deflection separator.

The grating 12 is pivotably mounted at its upper end to the inner wall of the raw gas duct 10. The grating is also arranged to swing from the wall 11 under the action of a cleansing compressed air pulse from the jets 7 above either filter cell unit 3. Coarse particles which are collected between the grating 12 and the wall 11 can thus depart towards the screw conveyor 2. To give the grating a distinct movement away from the wall 11, in response to the compressed air pulses, a screen (not shown) or the like can be joined to the grating and adapted for catching the compressed air shock to urge the grating into such a movement.

The grating 12 engages with its downward free end against the wall 11 apart from an outlet gap 14 arranged between wall and grating. Such particles as are separated by the deflection of the raw gas flow, can be taken further towards the screw conveyor 2 through this gap if said particles are not too coarse.

The grating 12 can be made up from lamels 13 and some kind of frame, or can consist of a louvre-punched plate where the louvres form the lamels or baffles 13.

Figure 2:
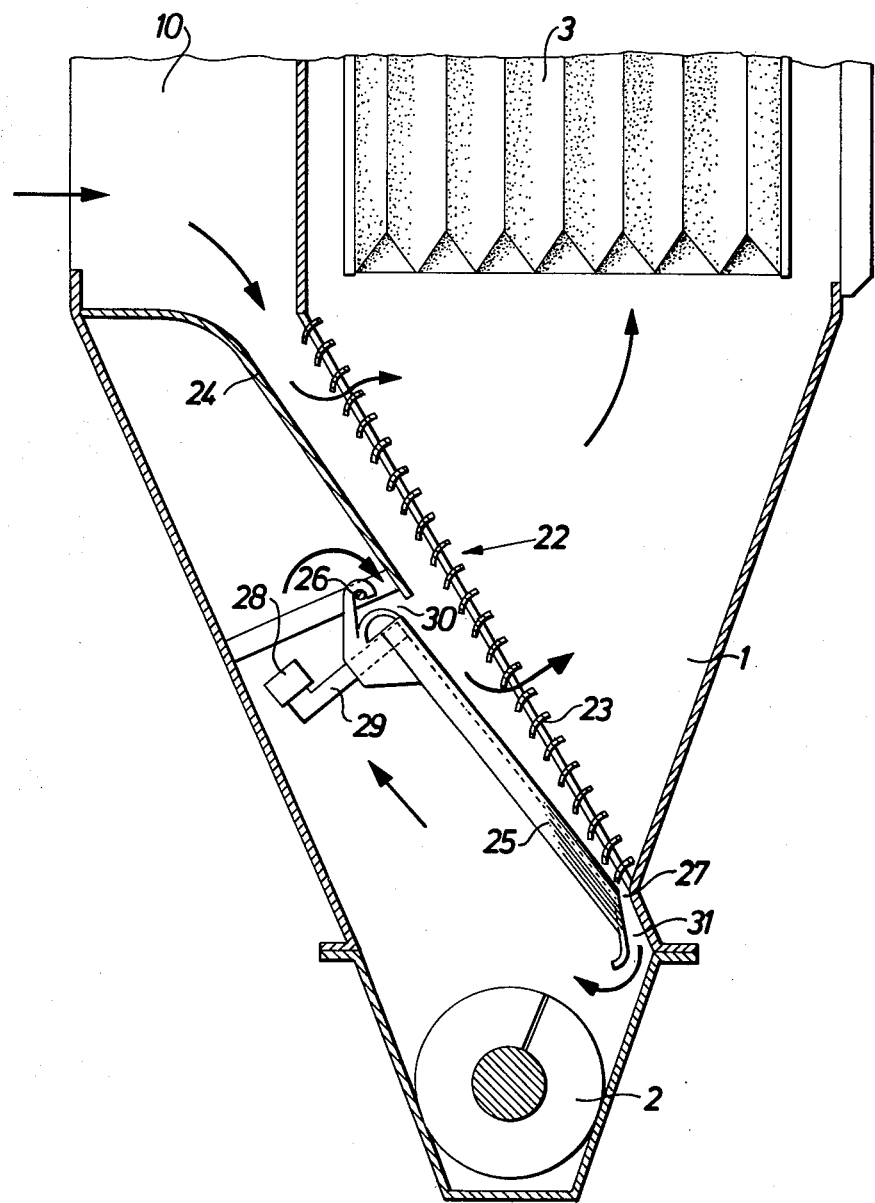
FIG. 2 shows in a similar way a vertical partial section through a second embodiment.

FIG. 2 shows the lower portion of a compact cell filter apparatus, which is otherwise identical to the one shown in FIG. 1.

The dust chamber 1 has a screw conveyor 2 here as well. In this case, however, only one compact filter cell unit 3 is arranged in the upper part of the chamber, this filter unit having its clean gas end positioned upward in the collection chamber (not shown), which has the cleaning jets in its roof.

In this case also, the raw gas in the raw gas duct 10 is first taken downward and then strongly deflected upwards by an inclined grating 22 with lamels or baffles 23. In contrast to the previously described grating 12, this grating 22 is rigidly mounted. Neither does it extend close to any of the walls of the dust chamber 1, but forms a duct, together with an intermediate wall portions 24, 25, tapering downwardly in the direction of the raw gas flow, said duct extending inclined through the dust chamber from one side wall to the opposing side wall. The screw conveyor 2 is situated below the grating 22 and the intermediate wall portions 24, 25, and is separated by means of the grating and the intermediate wall portions from the portion of the dust chamber where the filter cell unit 3 is situated.

The outer portion 25 of the wall portions 24, 25 in the flow direction of the raw gas flow between the grating 22 and the wall portions 24, 25 is pivotably mounted at its inner edge about a center line 26 so that its outer free end can be moved away from the vicinity of the grating 22 by swinging the wall portion 25. An outlet gap 27 for particles, provided for normal operation at this edge, is hereby increased so that the coarse impurities collected can also depart to the screw conveyor 2. The wall portion 25 is kept in a normal operational position by means of a counterweight 28 on a lever 29 extending from the wall portion. When cleaning the filter cell unit 3, the compressed air shock overcomes the closing action of the counterweight 28 so that the wall portion 25 is caused to swing away from the grating 22.

Between the fixed upper portion 24 and the lower pivotable portion 25 of the intermediate wall portions 24, 25 there is arranged a gap 30, which opens out in a subpressure chamber obtained by orientating the wall portions 24 and 25 in different planes, so that the raw gas passage between the grating 22 and the intermediate wall portions 24, 25 is expanded in a jump at the gap 30. During normal operation, the gap 30 serves to allow a partial gas flow of raw gas to circulate round the pivotable wall portion 25, driven by the ejection action at the gap 30 and the excess of dynamic pressure in the gap 27, the latter being recovered to a major extent as static pressure by means of a terminating, diffusor-like portion 31 after the gap 27. The circulating partial gas flow facilitates the conveyance of such not too coarse particles which are separated on deflecting the raw gas flow, so that these particles can be continuously supplied to the lower part of the dust chamber for further conveying by the screw conveyor 2.

Figure 3:
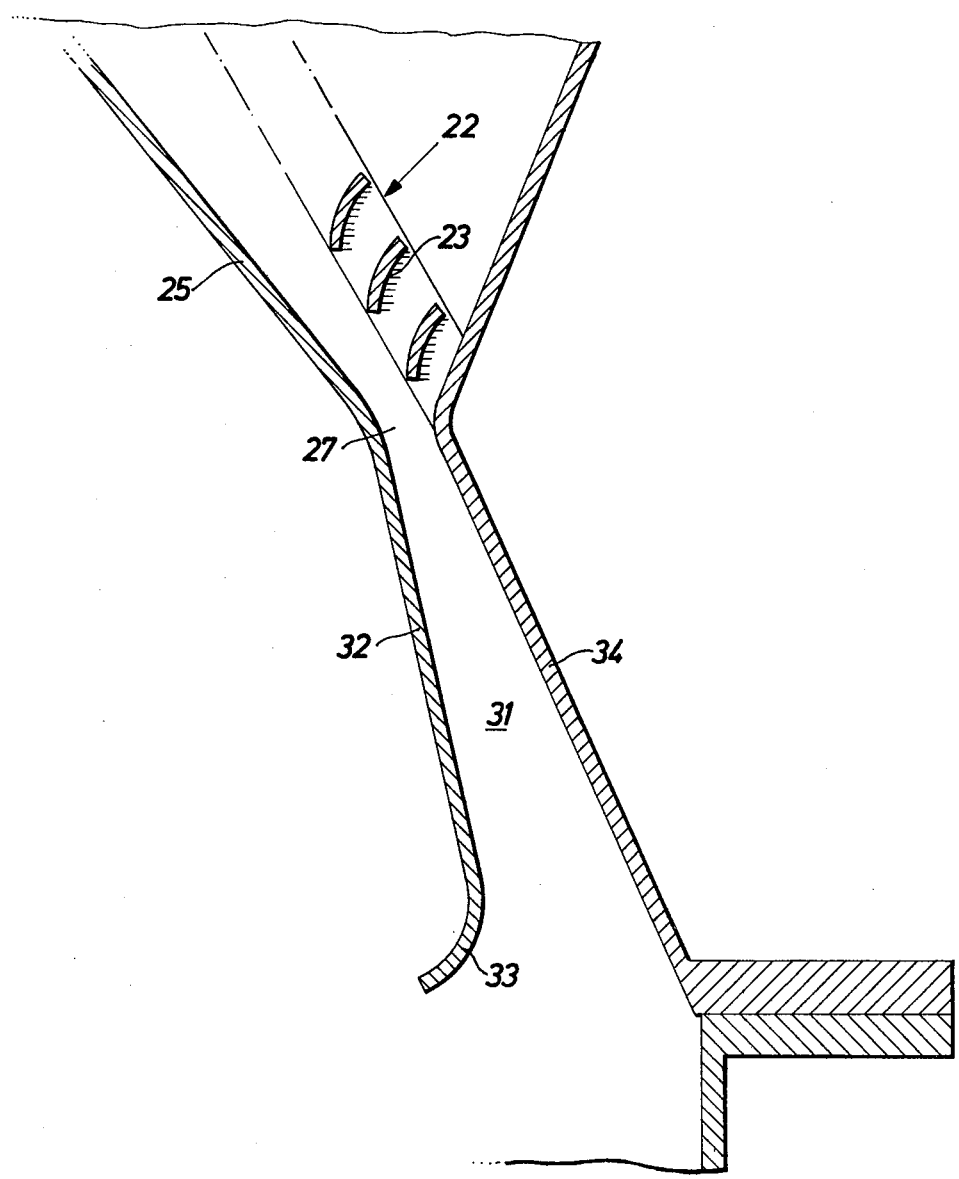
FIG. 3 is a partial enlargement of a portion of a filter apparatus according to FIG. 2.

As is apparent from FIG. 3, the diffusor-like portion 31 is provided by the downward, free edge of the pivotable lower wall portion 25 being bent so as to form, with a straight portion 32 before a terminating rounded portion 33, a suitable diffusor angle to an opposing portion 34 of one side wall of the dust chamber. The portion 34 is orientated to form an extension of the grating 22 substantially in the plane of the grating.

From FIG. 3 there is also apparent a suitable, curved cross sectional shape of the lamels or baffles 23 of the grating, with a convex side facing towards the main impinging direction of the raw gas flow.

What is claimed as new and desired to be secured by Letters Patent of the United States is:

1. A compact cell filter apparatus comprising:
   a housing;
   at least one filter cell in said housing having a gas flow direction;
   a dust chamber adjacent to, and communicating with, the upstream end of said at least one cell;
   a raw gas duct on said housing, said gas flow direction being from said raw gas duct towards said at least one filter cell, said raw gas duct being adjacent to, and communicating with, the upstream end of said dust chamber, said raw gas duct including a boundary wall at its downstream end;
   filter cleaning means communicating with the downstream end of said at least one cell, said filter cleaning means including gas blast means for providing gas blast shocks in a direction opposite that of said gas flow direction;
   gas deflector means located between said dust chamber and said raw gas duct, said gas deflector means and said boundary wall together forming a tapering duct for supplying raw gas from said raw gas duct to said dust chamber, one of said gas deflector means and said boundary wall being at least partially movable in response to said gas blast shocks, said tapering duct narrowing to a passage whose width varies in response to the movement of said one of said gas deflector means and said boundary wall, whereby said movement of said one of said gas deflector means and said boundary wall helps remove dust particles from said passage.

2. The filter apparatus of claim 1 wherein said gas delfector means comprises a movable deflector element having a pivotable end and a free end, said free end being separated from said boundary wall by said passage.

3. The filter apparatus of claim 1 wherein said boundary wall comprises an upstream fixed section and a downstream movable section, said movable section having a pivotable end and a free end, said free end being separated from said boundary wall by said passage.

4. The filter apparatus of claim 3 wherein said boundary wall includes a circulation gap between said fixed and movable secions, whereby a partial gas flow is caused to circulate around said movable section.

5. The filter apparatus of claim 3 or claim 4 wherein said deflector means comprises an unperforated extension and said free end and said unperforated extension form a diffuser means immediately downstream from said passage.

* * * * *